Sept. 12, 1939.　　　　B. J. DIRKS　　　　2,172,366
SAW FILING APPARATUS
Filed Feb. 4, 1939

Inventor
Bernd J. Dirks
By J. F. Mothershead
Attorney

Patented Sept. 12, 1939

2,172,366

UNITED STATES PATENT OFFICE 2,172,366

SAW FILING APPARATUS

Bernd J. Dirks, Prince Georges County, Md.

Application February 4, 1939, Serial No. 254,542

3 Claims. (Cl. 76—31)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of March 3, 1883, as amended by the act of April 30, 1928 (ch. 460, 45 Stat. L., 467).

This invention relates to a device for facilitating the hand filing of saws.

One of the inaccuracies resulting from the filing of saws by hand is due to the difficulty of presenting the cutting surfaces of the file to the saw teeth at a uniform angle. Slight rotation of the file on its longitudinal axis will seriously disturb the angles of the saw teeth to such an extent that when the filing operation is completed, there may not only be a lack of uniformity in the angles of the teeth, but also a lack of uniformity in their height and spacing.

The invention has for its object to prevent rotation of the file on its longitudinal axis during the hand filing operation of a saw, and not only facilitate the operation, but at the same time insure a more uniform and satisfactory job; resulting in more efficient and greatly improved cutting action of the saw in use.

With this object in view the invention consists of the device which includes a freely pivoted and slidable radius rod positioned and connected to the file in a certain relation to the saw teeth.

Referring to the accompanying drawing

Figure 1:
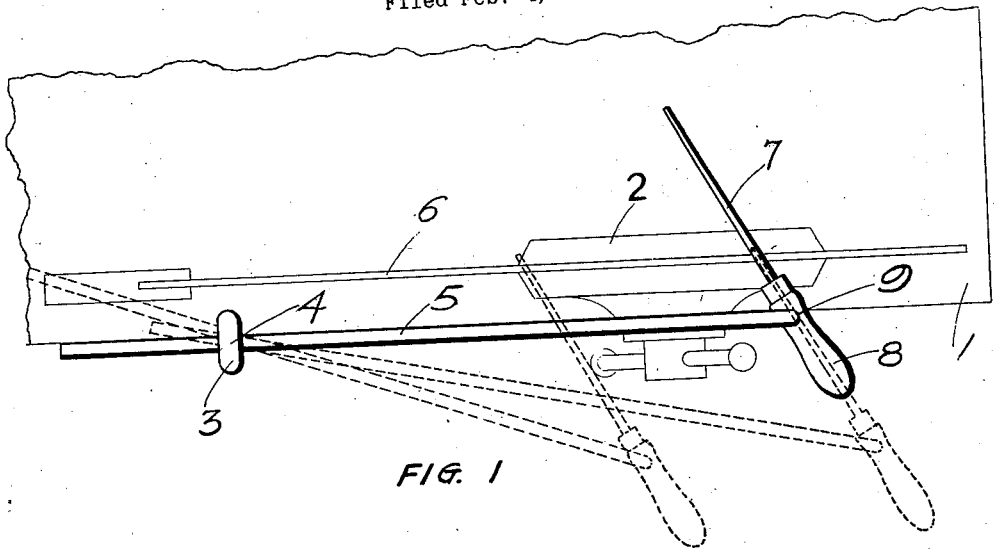
Fig. 1 is a top plan view illustrating a hand saw clamped in a conventional saw vise and showing the device in different operating positions in full and dotted lines.
Figure 2:
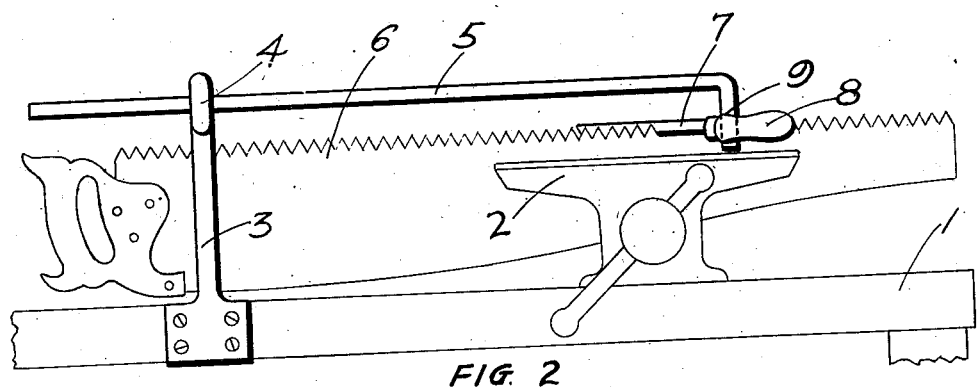
Fig. 2 is a front elevation of the same.
Figure 3:
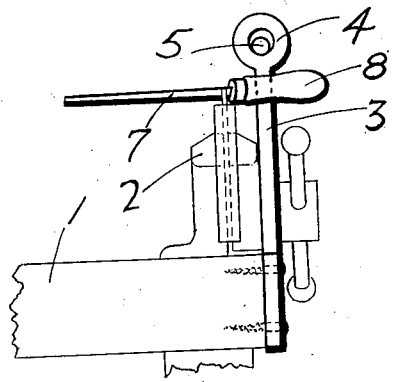
Fig. 3 is an end elevation of the same.

Like numerals of reference indicate the same parts throughout the several figures, in which 1 indicates a bench or table, upon which a conventional saw vise 2 is mounted.

Positioned on the bench 1 in proximity to the saw vise 2, is an upstanding bracket 3 having in its upper end an eye 4, through which eye, the radius rod 5 is rotatable and freely slidable in a direction longitudinally of the saw.

6 indicates a hand saw clamped in the saw vise 2 in proper position to be subjected to the filing operation, and 7 indicates a file which includes a file-handle 8. The file-handle 8 may be provided with a vertical hole 9 and the radius rod 5 may have its end bent down at a right angle to enter the hole 9 in the saw handle in order to permit the file to freely pivot on a transverse axis and swing in a horizontal plane with respect to the radius rod 5. In lieu of this simple form of connection of the radius rod with the file any other suitable connection of the radius rod with the file may be employed which will freely permit the file to pivot and swing in a horizontal plane, but which will not permit the file to rotate on its longitudinal axis. Whatever expedient is employed to effect such connection of the radius rod with the file, the cutting surfaces of the file must be arranged with relation to the saw so that they will meet and engage the saw teeth at the proper or desired angle. When this angular setting of the cutting surfaces of the file has been accomplished, any further change of angle is prevented by the radius rod, and a uniform holding of the angle of the file throughout the entire filing operation is assured.

In operation, the height of the tooth line of the saw 6 is positioned in the saw vise 2, so that it lies in a horizontal plane parallel to the horizontal plane of the radius rod.

When the filing operation is commenced at one end of the saw, the radius rod 5 freely slides through the eye 4 of the bracket 3 and the file is applied to the saw teeth in the usual filing motion. As the radius rod 5 swings in the eye 4 in accordance with the movement imparted to the file, the file is caused to maintain its tangential position by the skill of the operator with respect to the varying arcs and their radii described by radius rod 5, so that while the movement of the file is free and unhampered in its movement imparted by the hand of the operator rotation of the file on its longitudinal axis which would alter the angles of the file surfaces with respect to the saw teeth is prevented.

Having thus fully described the invention, I do not wish to be understood as limiting myself to the exact construction shown and described, as various changes in the construction and arrangement of the parts can be made without departing from the spirit of the invention, and I consider myself clearly entitled to all such changes and modifications as fall within the scope of the appended claims.

I claim:

1. A device for facilitating the hand filing of saws, which includes a bracket having an eye thereon, a radius rod pivoted in said eye and rotatable therein, and freely slidable in said eye in a direction longitudinal of the saw, the free end of the radius rod being bent downwardly at right angles thereto for pivotal connection to the file to restrain the file from rotating on its longitudinal axis but to permit the file to freely pivot on a vertical transverse axis, the whole arranged whereby the radius rod being longitudinally slidable within the eye of the bracket permits free movement of the file longitudinally of the saw, and unrestricted movement of the file on a transverse horizontal axis provided by the pivoted radius rod and unrestricted movement of the file on a transverse vertical axis provided by the connection between the file and the radius rod.

2. A device for facilitating the hand filing of saws, which includes a radius rod, means for establishing a rotating and pivoting connection of the radius rod and also a sliding connection of the radius rod in a direction longitudinally of the saw, the free end of the radius rod being bent downwardly at right angles thereto for pivotal connection to the file to restrain the file from rotating on its longitudinal axis, but to permit the file to freely pivot on a vertical transverse axis, the whole arranged whereby the radius rod being longitudinally slidable permits free movement of the file longitudinally of the saw, and unrestricted movement of the file on a transverse horizontal axis provided by the pivoted radius rod and unrestricted movement of the file on a transverse vertical axis provided by the connection between the file and the radius rod.

3. A device for facilitating hand filing of saws, which includes a radius rod, means for establishing a rotating and pivoting connection of the radius rod and also a sliding connection of the radius rod in a direction longitudinally of the saw and means for effecting a pivotal connection between the free end of the radius rod and a file to permit the file to freely pivot on a vertical transverse axis but to restrain the file from rotating on its longitudinal axis, the whole arranged whereby the radius rod being longitudinally slidable permits free movement of the file longitudinally of the saw and unrestricted movement of the file on a transverse horizontal axis provided by the pivoted radius rod and unrestricted movement of the file on a transverse vertical axis provided by the connection between the file and the radius rod.

BERND J. DIRKS.